Oct. 17, 1967  S. O. EVANS  3,347,716

METHOD OF AND APPARATUS FOR INHIBITING SCALE FORMATION

Filed Dec. 15, 1964

INVENTOR
Sidley O. Evans

BY

ATTORNEY

United States Patent Office 3,347,716
Patented Oct. 17, 1967

3,347,716
METHOD OF AND APPARATUS FOR
INHIBITING SCALE FORMATION
Sidley O. Evans, Beaver Falls, Pa., assignor to The
Babcock & Wilcox Company, New York, N.Y., a
corporation of New Jersey
Filed Dec. 15, 1964, Ser. No. 418,521
5 Claims. (Cl. 148—13.1)

ABSTRACT OF THE DISCLOSURE

A method and apparatus for inhibiting the formation of scale upon metallic workpieces heated within an induction furnace whereby a volatile boron compound is sprayed as a vapor into the furnace under pressure to displace the oxidizing atmosphere therefrom and to deposit a scale inhibiting protective coating of boric oxide to the workpiece by reactive contact between the hot surface thereof and the boron compound vapor.

---

Figure 1:
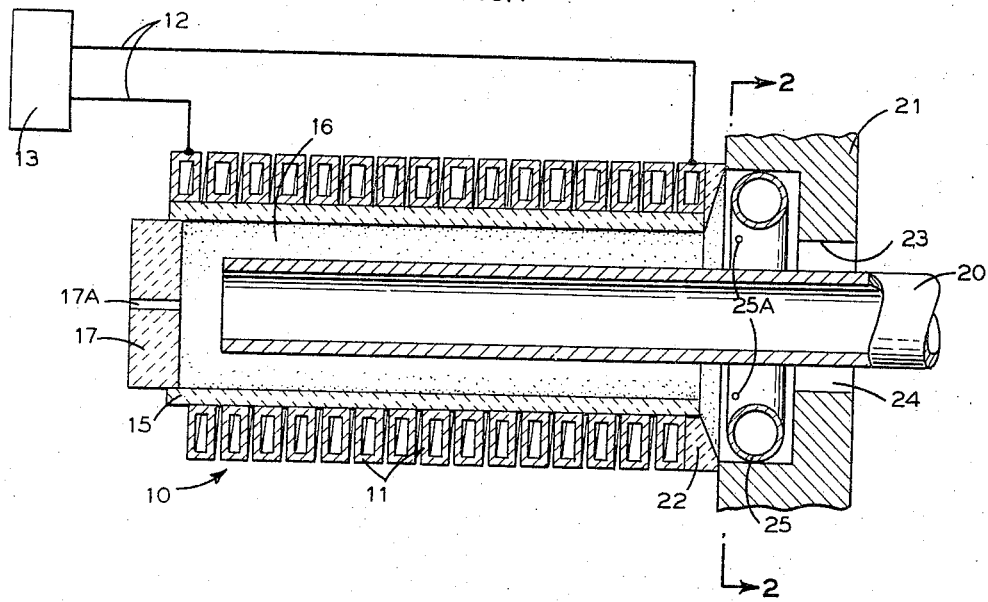

This invention relates to the inhibiting of scale formation on a metallic member as it is being heated in an induction furnace preparatory to hot-working.

In the heating of metals prior to their being hot-worked as by drawing, extrusion, swaging, etc., the formation of scale (metallic oxides) on the workpiece may result in a substantial loss of metal in a large volume operation. Moreover, the formation of scale on such workpieces is particularly objectionable because of its effect on the sizing and surface finish of the formed product. If the scale is not removed, it not only results in metal loss and surface irregularities, but may also cause excessive wear on metal forming tools, as well as irregularities in the metal working operation itself. Chemical removal, as for example by pickling, of the scale prior to the hot-working operation is not possible since this would involve cooling of the workpiece below its hot-working temperature. Mechanical descaling devices are sometimes used, but they are not capable of effectively removing all of the scale. For example, high pressure water sprays have been used for satisfactory descaling under some conditions; however, the descaling effectiveness varies considerably for different alloys.

Recent efforts have been directed toward the development of scale inhibitors. For example, attempts have been made to inhibit scaling in direct fired furnaces by firing the furnaces with an excess of fuel, thereby precluding the presence of oxygen and maintaining carbon dioxide at a low level within the furnace. Such practices involve considerable waste of fuel and require costly equipment to achieve satisfactory furnace atmosphere control. Another approach involves the introduction of scale inhibiting chemicals, such as compounds of boron, into the furnace atmosphere along with the gaseous products of combustion, as shown in U.S. Patent No. 2,723,927, issued Nov. 15, 1955 in the name of S. Tour. This approach has been successfully used to inhibit scale formation; however, because of the diluting effects of the combustion products, relatively large quantities of scale inhibiting chemicals are necessary to provide an effective concentration of the active chemicals in the furnace atmosphere.

Furnace atmosphere control has been especially ineffective in installations such as induction furnaces which are designed for rapid heating of workpieces on a "batch" basis. In such furnaces the frequent insertion and removal of workpieces affords an opportunity for an almost constant exchange of atmospheres between the furnace space and the outside air. The problem is even more severe where only a portion of the workpiece is to be heated, since the furnace must then be provided with an opening through which the workpiece must project. Moreover, the opening in such a furnace must afford sufficient clearance for the workpiece commensurate with the accuracy and consistency of the handling equipment used to insert the workpiece portion into the furnace.

The induction heating of workpieces is frequently performed by inserting the workpieces into a series of induction furnaces, wherein the temperature is raised only a portion of the desired total in each successive furnace. It has been found that this technique results in greater accuracy in attaining the desired final temperature because each workpiece is heated more slowly and its time-temperature curve is more nearly asymptotic to the desired final temperature. Such a system, however, only accentuates the problem of atmosphere control in the multiple furnace chamber since it involves additional insertions and removals of the workpieces into and from the furnaces.

It is therefore an object of the present invention to provide a method of inhibiting the formation of scale on metal workpieces as they are being heated in induction furnaces preparatory to hot-working. It is a further object of this invention to provide, within an induction furnace, an atmosphere containing scale inhibiting chemicals relatively undiluted by gases that are potentially reactive with the surface of the workpiece being heated, and to thereby reduce the quantity of scale inhibiting chemicals used and improve the effectiveness of scale inhibition.

To attain these objects the present invention embodies the method of inhibiting the formation of scale in the heating of a metallic workpiece in an induction furnace, which method comprises introducing, under pressure into the furnace free space around the portion of the workpiece being heated, a volatile compound of boron at a temperature below the melting point of boric oxide, and inducing heat in the workpiece by subjecting the workpiece to the effects of a magnetic field whereby sufficient heat is generated in the workpiece to raise the temperature of the volatile compound of boron in the immediate vicinity of the workpiece above the melting point of boric oxide.

The present invention advantageously utilizes the unique characteristic of induction heating whereby the initial manifestation of the heat produced is in the workpiece itself, the heat being produced by the current flow in the workpiece, which current flow is induced by the alternating magnetic field caused by the flow of current through the induction coil or conductor. With the workpiece itself being the source of heat, the protection producing chemical (boric oxide), which is formed from the boron compound upon the application of heat thereto, is concentrated in the immediate vicinity of the workpiece. Thus dispersion and consequent loss of the protective chemical is reduced. Moreover, according to the present invention, the effectiveness of the scale inhibiting boron compound is not reduced by dilution with gaseous combustion products.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
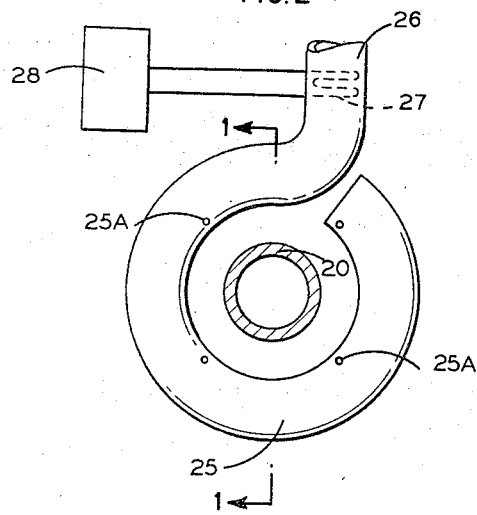

In the drawings:

FIG. 1 is a partially diagrammatic sectional view (taken along line 1—1 of FIG. 2) of an induction furnace adapted for the practice of the present invention; and FIG. 2 is a view taken along lines 2—2 of FIG. 1 and having portions thereof omitted.

The invention will be described hereinafter in terms of a ferrous metallic tubular workpiece, the end portion of which is being heated preparatory to an operation such as swaging. However, it should be recognized that the invention is equally adaptable for use in conjunction with the workpieces of different metals and/or formed in other shapes, as well as for the heating of workpieces preparatory to other hot-working operations.

Referring to the drawings, the main element of the induction furnace 10 is a cylindrical shaped induction conductor or coil 11, formed by a helically wound hollow, water-cooled conductor member having a rectangular cross-section. The ends of the induction coil 11 are suitably connected by leads 12 to a controllable power source 13, whereby the current flow through the coil 11 may be regulated. The innermost surfaces of the coil 11 engage with the open-ended, cylindrical, ceramic heat resistant liner 15 which protects the coil 11 from heat generated within the furnace chamber or space 16 defined by the liner 15. One end of the liner 15 is substantially closed by a refractory end plug 17 which may have formed therein a centrally disposed opening 17A. Spaced from the opposite end of the liner 15 and the coil 11 is a furnace front plate 21, this space being filled by a suitably shaped annular refractory filler member 22. The front plate is formed with an opening 23 through which the workpiece or tube 20 is inserted into the furnace space 16. A reasonable clearance space 24 is provided between the workpiece 20 and the periphery of the opening 23, the extent of clearance being dependent on the accuracy with which the workpiece handling equipment (not shown) directs the tube 20 into the furnace 10 through the opening 23. Embedded within the front plate 21 is a manifold 25 having the shape of an unclosed torus and having formed therein a plurality of circumferentially spaced holes or nozzles 25A opening into the furnace space 16 and being directed generally along the outer surface of the tube 20. A supply pipe 26 connects the manifold to a suitable source (not shown) of scale inhibiting chemical that is to be introduced into the furnace chamber 16. A heater 27 connected to a controllable source of heating medium 28 may be disposed within the supply pipe 26 for controlling the temperature of the chemical flowing therethrough.

According to the present invention, the scale inhibiting chemical supplied to the pipe 26 may be any volatile compound of boron, in the liquid phase; however, preferably it will be an alkyl borate, such as methyl borate. Although the boron compound may be sprayed through the openings 25A into the chamber 16 as a liquid, preferably it is vaporized by means of the heater 27 and projected into the free space of the chamber 16 as a vapor. In whatever form the boron compound is introduced it is necessary to control the temperature of the entering jets or streams to a level below the melting temperature of boric oxide ($B_2O_3$), as it has been found that above this temperature boric oxide may accumulate as a viscous liquid around the holes 25A, and plug them. Preferably the incoming temperature of the boron compound should be maintained below about 750° F. to avoid any possibility of deposition and consequent pluggage of the holes 25A. It should be noted that the manifold 25 is purposely formed as an unclosed loop to prevent excessive heating of the manifold due to its being in the magnetic field produced by the coil 11. Actually, the manifold 25 will be warmed by induced currents from the magnetic field even when it is formed as an unclosed loop. Moreover, this heating effect plus radiated heat from the workpiece may eliminate the need for the heater 27 in some installations.

The nozzles 25A project the boron compound into the furnace space 16 along the outside of the tube 20. When the workpiece is a tube as shown, it may also be desirable to introduce a small quantity of boron compound into the inside of the tube 20, as for example through the opening 17A in the end plug 17 to ensure that all of the workpiece surface that is being heated will be immersed in the vapors of the scale inhibiting chemicals.

In operation, the workpiece or tube 20 is inserted into the induction furnace chamber 16, and heat is generated in the tube 20 due to the alternating magnetic field produced by the flow of current through the coil 11. As the tube is heated, boron compound is dispersed within the free space of the chamber 16 as described above. As the tube temperature increases above the melting point of $B_2O_3$, the boron compound in the immediate vicinity of the tube is heated, thereby causing a deposition of liquid $B_2O_3$ on the tube surface. Although a nominal amount of the vaporized boron compound may escape from the furnace space 16 through the annular clearance space 24, it should be recognized that because the heat emanates from the workpiece itself, the liquefied $B_2O_3$ will be concentrated in the immediate vicinity of the tube 20 where it is to be used, rather than being dispersed evenly throughout the free volume of the chamber 16, in which instance a larger quantity would tend to escape. Having deposited a coating of $B_2O_3$ on the tube 20, the introduction of boron compound may be terminated before the tube 20 is withdrawn from the furnace 10.

By introducing the boron compound into the chamber 16 under pressure, substantially all of the oxygen initially present will be purged from the chamber 16. Moreover, any remaining oxygen will be consumed in the combustion of the boron compound carrier. For example, if methyl borate is the chemical being used, methyl alcohol will be available for combustion. It should however be recognized that any heat produced by combustion of the carrier will be insignificant in relation to the total heat induced in the workpiece. Thus in the present invention, not only is a scale inhibiting coating being placed on the workpiece, but the oxygen necessary for the formation of scale is also being excluded from the furnace chamber 16 during heating of the workpiece.

Where a series of induction furnaces are being used to sequentially heat a workpiece to a given end temperature, further factors may be considered in the efficient and economic use of the boron compound. For example, once the protective coating of $B_2O_3$ has been deposited on the workpiece in one furnace, it may not be necessary to introduce additional boron compound in the subsequent heating furnaces because the liquid phase of $B_2O_3$ is stable up to a temperature above 2500° F. Also to be considered is the fact that the use of the boron compound in a furnace in which the workpiece does not attain a temperature as high as the melting point of $B_2O_3$ will be relatively inefficient since the $B_2O_3$ will not be present in the liquid phase in such a low temperature furnace.

Thus, it can be seen that by the practice of the above described invention, effective inhibition of scale formation may be attained, while the quantity of scale inhibiting chemicals used may be substantially reduced with respect to methods heretofore known, because the active protection producing chemical vapors are not diluted by the presence of potentially deleterious combustion gases, and because the workpiece itself is the source of heat which converts the scale inhibiting chemicals into the state in which they are used.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. The method of inhibiting the formation of scale in the heating of a metallic workpiece, which method comprises inducing heat in the workpiece by subjecting the workpiece to the effects of an alternating magnetic field produced by an induction coil surrounding the portion of the workpiece to be heated and delimiting a furnace chamber, and introducing under pressure into the free space of the furnace chamber a volatile compound of boron in vapor form and in sufficient quantity to substantially displace the atmosphere within the free space of the furnace.

2. The method of inhibiting the formation of scale in the heating of a metallic workpiece in an induction furnace, which method comprises introducing under pressure into the free space of the furnace a volatile compound of boron at a temperature below the melting point of boric oxide, and inducing heat in the workpiece by subjecting the workpiece to the effects of an alternating magnetic field whereby sufficient heat is generated in the workpiece to raise the temperature of the volatile compound of boron in the immediate vicinity of the workpiece to above the melting point of boric oxide.

3. The method of inhibiting the formation of scale in the heating of a metallic workpiece in an induction furnace, which method comprises introducing under pressure into the free space of the furnace a volatile compound of boron at a temperature below the melting point of boric oxide, the volatile compound of boron being introduced at a temperature below 750° F. and in sufficient quantity to displace substantially all of the atmosphere within the furnace free space, and inducing heat in the workpiece by subjecting the workpiece to the effects of an alternating magnetic field whereby sufficient heat is generated in the workpiece to raise the temperature of the volatile compound of boron in the immediate vicinity of the workpiece to above the melting point of boric oxide.

4. Apparatus for heating a metallic workpiece to a working temperature comprising an electrical conducting member, a power source connected to said member for supplying thereto alternating electric current whereby an alternating magnetic field is created around said member, means defining a furnace chamber within said magnetic field, means defining an opening to said chamber through which at least a portion of the workpiece is inserted, a source of a volatile compound of boron, nozzle means connected to said source for introducing into said chamber in the immediate vicinity of said workpiece a quantity of said volatile compound of boron, and control means for varying the magnetic field so as to induce heat in said workpiece.

5. Apparatus for heating a portion of an elongated metallic workpiece to a working temperature comprising an electrical conducting member wound to form a coil, a power source connected to said coil for supplying thereto alternating electric current whereby an alterating magnetic field is created within said coil, a substantially cylindrical refractory liner disposed within said coil and delimiting a furnace chamber, means forming an opening to said furnace chamber through which the workpiece projects when said portion of the workpiece is inserted into said furnace chamber, a source of volatile compound of boron, means including nozzles connected to said source and arranged for introducing said volatile compound of boron into said furnace chamber so as to displace substantially all of the atmosphere within said furnace chamber with an atmosphere consisting substantially only of the vapors of said boron compound, and control means for varying the magnetic field so as to induce heat in said workpiece.

References Cited
UNITED STATES PATENTS

| | | | |
|---|---|---|---|
| 1,726,431 | 8/1929 | Fourment | 148—13.1 |
| 2,307,005 | 12/1942 | Ruben | 148—20.3 |
| 2,723,927 | 11/1955 | Tour | 148—16.7 |
| 2,930,724 | 3/1960 | Rudd | 148—157 |
| 3,268,370 | 8/1966 | Kimbrough | 148—20.3 |

DAVID L. RECK, *Primary Examiner.*

HYLAND BIZOT, *Examiner.*

R. O. DEAN, *Assistant Examiner.*